3,065,195
COATING COMPOSITIONS COMPRISING A POLY-EPOXIDE RESIN, AN ACRYLIC TERPOLYMER RESIN AND A LATENT CURING CATALYST, AND METHOD OF PREPARATION
Joseph A. Vasta, Sharon Hill, Pa., assignor to E. I. du Pont de Nemours and Company, Wilmington, Del., a corporation of Delaware
No Drawing. Filed Dec. 3, 1959, Ser. No. 856,938
16 Claims. (Cl. 260—41)

This invention relates to novel liquid coating compositions including, as the essential organic film-forming material, a curable mixture of (a) a soluble carboxyl-containing copolymer of ethylenically unsaturated monomers and (b) a soluble epoxy condensate having an average of more than one 1,2-oxirane oxygen atom per molecule, a volatile liquid including an organic solvent for the film-forming material; and, an effective curing proportion of a substantially water-insoluble organoammonium organoborate salt as a latent curing agent for the organic film-forming material. More particularly, the invention relates to package-stable liquid coating compositions including the described essential mixture of soluble organic film-forming materials wherein the carboxyl-containing copolymer is the polymerization product of a mixture of ethylenically-unsaturated monomers, at least ternary in composition, including a hydrocarbon monomer, a neutral alkanol ester of an alpha ethylenically unsaturated carboxylic acid, and a carboxylic acid monomer having alpha ethylenic unsaturation, the copolymer and 1,2-epoxy condensate being in such proportions that the molar ratio of $$\frac{\text{1,2-oxirane oxygen}}{\text{—COOH}}$$

is in the range of 0.25 to 10 and, as a latent curing agent therefor, an organoammonium organoborate salt having a monovalent organoboron anion which includes at least three aryl radicals joined to the boron atom and having an organoammonium cation of which at least one radical joined to the ammonium nitrogen atom is organic and the remaining radicals up to three are —H.

Numerous soluble compounds including acids, amines and quaternaryammonium salts, are known to be useful for curing epoxy compounds having a plurality of 1,2-oxirane oxygen atoms per molecule and for crosslinking such compounds in combination with compounds having a plurality of carboxyl substituents. Unfortunately, however, effective small proportions of these soluble curing agents sufficient to effect adequate cure at baking temperatures ordinarily in the range of 250° F. to 500° F. are significantly reactive even at ordinary room temperature to cause instability in the catalyzed composition during storage. Thus it is usual practice to package the product in two parts to be combined immediately prior to use, one package containing the uncatalyzed composition and the second package containing an appropriate proportion of the curing agent.

When a product is supplied in the form of a plurality of package units to be combined by the user, there is risk of non-uniformity of the final combination, risk of improper proportions unless a full package of the catalyst is combined with a full package of the uncatalyzed composition, and risk of having a surplus of catalyzed composition which cures significantly in the package before it is consumed. In many instances the cure rapidly advances to a degree requiring discard of the catalyzed composition.

I have discovered that substantially water-insoluble organoammonium organoborate salts having an aryl-boron anion, preferably having three to four phenyl or strongly electronegative substituted phenyl radicals joined to the boron atom, incorporated in the liquid coating composition essentially based on the above indicated curable mixture of organic film-forming materials, at an effective curing proportion in the range of 0.1 to 3 parts per 100 parts by weight of these curable organic film-forming materials sufficient to cure the same at a baking temperature of 250° to 500° F., provides a composition which can be stably-packaged as a ready-to-use product. This product remains liquid for a practical storage period, such as for example six months, at temperatures which do not significantly exceed ordinary room temperature.

Useful organoammonium organoborate salts are characterized as having an organoboron anion wherein four electronegative radicals are joined to the boron atom, at least three of these radicals being aryl, preferably phenyl or substituted phenyl radicals which are strongly electronegative. Useful substituents joined to a phenyl ring carbon atom preferably are limited to one per phenyl ring and the substituent is preferably joined to the para carbon atom of the ring, although ortho and meta substituents are operative in some instances. Suitable substituents on the phenyl ring are the halogens —F, —Cl, —Br, —I, cyano(—CN), hydroxyl, nitro (—NO$_2$), and C$_1$–C$_4$ alkyl. The organoboron anion can have one of the electronegative radicals —CN, —F, —Cl and —Br joined to the boron atom, the remaining three radicals joined thereto being aryl. These organoboron anions can be represented by the general structure

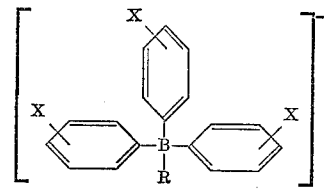

whereof the radical

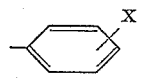

is an electronegative aryl radical and the substituent —X is either —H to provide the electronegative phenyl radical or one of the monovalent substituents heretofore indicated which provides operative monosubstituted electronegative phenyl radicals for the organoboron anion of useful latent curing agents.

The structure of the organoammonium cation is not particularly critical. At least one of the four radicals joined to the ammonium nitrogen atom is organic and up to three of the radicals may be —H, i.e. monoamines can be used to provide [RNH$_3$]$^+$ cations, secondary amines can be used to provide

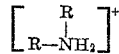

cations and tertiary amines can be used to provide

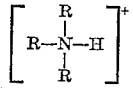

cations wherein the R radicals can be alike or unlike. Furthermore, the nitrogen atom can be a member of a heterocyclic ring with two of the R— radicals representing a portion of the ring structure. The organic radical R— preferably consists solely of carbon and hydrogen. Suitable R— radicals may include oxygen in the form of a hydroxyl substituent or as an ether oxygen member of a heterocyclic ring. Preferred organoammonium cations are quaternary ammonium cations having four hydrocarbon radicals joined to the ammonium nitrogen atom including at least two $C_1$–$C_4$ alkyl radicals, the remaining radicals up to two being higher hydrocarbon radicals each having up to 20 carbon atoms. The $C_1$–$C_4$ alkyl preferably is —$CH_3$ and the higher hydrocarbon radicals preferably are $C_8$–$C_{20}$ acyclic hydrocarbon radicals.

These organoammonium cations can be represented by the general structure:

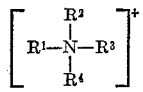

whereof one to four of the monovalent radicals $R^1$—, $R^2$—, $R^3$ and $R_4$— are $C_1$ to $C_{20}$ monovalent hydrocarbon radicals, any of the remaining said radicals joined to the ammonium nitrogen atom being —H when the hydrocarbon radicals are less than four.

The total number of carbon atoms in radicals joined to the ammonium nitrogen of the cation of practical organo-ammonium organoborate salts ordinarily does not exceed 50, those having no more than about 30 carbon atoms per cation being preferred.

The soluble alkyltrimethylammonium chlorides and dialkyldimethylammonium chlorides wherein the alkyl components are $C_8$–$C_{20}$ mixtures, commercially available from Armour Chemical Division under the trademark "Arquad," are advantageous sources of quaternaryammonium cations useful in the preparation of the preferred insoluble quaternaryammonium organoborate salts.

The following table shows the average proportions of hydrocarbon radicals in the higher alkyl portion of typical "Arquad" soluble quaternaryammonium chlorides having one to two higher alkyl groups joined to the ammonium nitrogen atom.

TABLE I

*Average Alkyl Composition*

MONALKYLTRIMETHYL

| "Arquads" | C-8 | C-10 | C-12 | C-14 | C-16 | C-18 | C-18 (ene) | C-18 (diene) |
|---|---|---|---|---|---|---|---|---|
| -12 | | | 90 | 9 | | | 1 | |
| -16 | | | | | 90 | 6 | 4 | |
| -18 | | | | | 6 | 93 | 1 | |
| -T | | | | 3 | 27 | 16 | 48 | 6 |

DIALKYLDIMETHYL

| | | | | | | | | |
|---|---|---|---|---|---|---|---|---|
| -2C | 8 | 9 | 47 | 18 | 8 | 10 | | |
| -2HT | | | | | 24 | 75 | 1 | |

MIXED MONOALKYL-DIALKYLDIMETHYL

| | | | | | | | | |
|---|---|---|---|---|---|---|---|---|
| T-2C | 4 | 5 | 23 | 10 | 17 | 13 | 24 | 4 |

Other useful sources of the ammonium nitrogen atom of the organoammonium cation are:

Primary amines $RNH_2$ where R— is: methyl, ethyl, propyl, isopropyl, butyl, isobutyl, pentyl, hexyl, cyclohexyl, 2-ethyl-butyl, octyl, 2-ethylhexyl, decyl, dodecyl, tetradecyl, hexadecyl, octadecyl, octadecenyl, eicosanyl, phenyl, p-hydroxyphenyl, p-bromophenyl, p-methylphenyl, p-butylphenyl, o-methylphenyl, o-methoxyphenyl, benzyl, alpha-naphthyl, 2-phenylethyl and 2-hydroxyethyl;

Secondary amines such as dimethyl-, diethyl-, methylethyl-, dipropyl-, diisopropyl-, dibutyl-, dibenzyl-, diphenyl, diethanol-, i.e. di-2-hydroxyl-, amines, morpholine, and N-methylaniline;

Tertiary amines such as trimethyl-, triethyl-, methyldiethyl-, ethyldimethyl-, tributyl-, dimethylbenzyl-, dibenzylmethyl-, triethanol-amines, N,N-dimethylaniline, quinoline and pyridine.

Polyamines such as ethylenediamine, hexamethylenediamine, polymethylenediamines, phenylenediamines, diethyltriamine and triethyltetra-amine can be used to provide useful insoluble salts having a plurality of organoboron anions per molecule.

The term substantially water-insoluble organoammonium organoborate salt as used throughout the specification and claims characterizes those salts having a solubility no greater than 1 part by weight per 100 parts of water at 25°C. Solubility of this order of magnitude permits these salts to be prepared by precipitation in an exchange reaction in water between a soluble compound having the pertinent organoboron anion and a soluble compound having the pertinent ammonium nitrogen atom having at least one organic radical joined thereto.

Useful water-insoluble organoammonium organoborate salts are generally prepared by an exchange reaction process by dissolving a soluble compound which supplies the ammonium nitrogen atom of the pertinent cation in water or aqueous solution of a water-soluble solvent and combining and mixing therewith an aqueous solution of a soluble compound which provides an approximately equivalent proportion of the pertinent organoboron anion thereby precipitating the organoammonium organoborate in the aqueous medium. The precipitated salt is separated from the aqueous mixture by filtration and is washed at least twice with water to remove water-soluble impurities. The aqueous wash is ordinarily followed by a wash with a water-soluble alkanol, such as anhydrous methanol or isopropanol, to facilitate drying. The salt is dried by volatile loss of the alkanol, but satisfactory drying can be accomplished by volatile loss of water from the water-washed salt.

It will be recognized that in selecting water-soluble salt compounds for the exchange reaction it is necessary to select salts which on the double exchange precipitates only the salt containing both the pertinent organoammonium cation and pertinent organoboron anion and retains the other product of the exchange reaction in aqueous solution. When the compound supplying the pertinent cation is significantly alkaline in solution, it is usual practice to acidify the aqueous solution with a water-soluble acid, such as acetic acid, in an amount sufficient to register acidity in the pH range of about 5 to 6.5. A temperature up to the boiling temperature of the solution can be used to prepare the separate aqueous solutions of the respective reactants, but these solutions of reactants ordinarily are combined and mixed at a temperature ordinarily no greater than 150° F., preferably at about room temperature. Some of the soluble quaternaryammonium salts which supply the pertinent cation are more readily soluble in mixtures of water-soluble alkanols and water. The aqueous reaction medium can include a water-soluble alkanol without adverse effect.

The following examples are typical of the preparation of preferred organoammonium organoborate latent curing agents.

*Catalyst A—Octadecyltrimethylammonium Tetraphenylborate*

Solution I:                                                     Parts by wt.
  Octadecyltrimethylammonium hydroxide—
    37.2% solution in methanol _____ 55
  Isopropanol _____ 287
  Acetic acid 98% _____ 7
Solution II:
  Sodium tetraphenylborate _____ 20
  Water _____ 180

The solution of quaternaryammonium hydroxide is prepared by mixing 200 parts of "Arquad"-18, 50% active concentration of alkyltrimethylammonum chloride in aqueous isopropanol, with 12.2 parts of sodium hydroxide dissolved in 61 parts of methanol, heating for one hour at about 105° F., and removing the precipitated sodium chloride therefrom by filtration. The filtrate contains 37.2% of the alkyltrimethylammonium hydroxide. The average composition of the higher alkyl radicals in this quaternaryammonium hydroxide corresponding to the chloride salt is shown in Table I.

Solution II is slowly added to Solution I with continuous vigorous agitation. The resulting precipitated octadecyltrimethylammonium tetraphenylborate is separated by filtration, washed twice with water to remove the soluble sodium salts, washed once with anhydrous isopropanol and dried by volatile loss of the isopropanol.

*Catalyst B—Octadecyltrimethylammonium Tetraphenylborate*

Solution I: Parts by wt.
"Arquad"-18—50% solution in aqueous isopropanol _____ 42
Water _____ 300
Acetic acid—98% _____ 7

Solution II:
Sodium tetraphenylborate _____ 20
Water _____ 180

The "Arquad"-18 is supplied at 50% concentration of quaternaryammonium chloride salt in aqueous isopropanol.

The method of preparation is the same as for Catalyst A. For all practical purposes Catalyst A and Catalyst B are identical.

*Catalyst C—Lauryltrimethylammonium Tetraphenylborate*

Solution I: Parts by wt.
"Arquad"-12—33% active solution in water__ 50
Water _____ 300
Acetic acid—98% to pH-6.

Solution II:
Sodium tetraphenylborate _____ 20
Water _____ 180

"Arquad"-12 is supplied at 33% concentration of the alkyltrimethylammonium chloride salt in water which ordinarily also contains about 16% of sodium chloride. The approximate composition of the alkyl component is preponderantly $C_{12}$ dodecyl as indicated in Table I.

The precipitated quaternary ammonium tetraphenylborate resulting from mixing the two solutions is separated by filtration, washed with water until practically free of sodium chloride, washed with anhydrous isopropanol and dried. In mixing, Solution II preferably is slowly added to Solution I but alternatively, Solution I can be added to Solution II.

*Catalyst D—Dialkyldimethylammonium Tetraphenylborate*

Solution I: Parts by wt.
"Arquad"-2HT—75% active in aqueous isopropanol _____ 47.2
Isopropanol _____ 200
Water _____ 100
Acetic Acid—98% to pH-6.

Solution II:
Sodium tetraphenylborate _____ 20.0
Water _____ 180.0

"Arquad"-2HT is a dialkyldimethylammonium chloride salt supplied at 75% active concentration in aqueous isopropanol and ordinarily includes about 0.5% of sodium chloride. The approximate composition of the two alkyl radicals is shown in Table I. The preparation of the quaternaryammonium salt, washing and drying is the same as in the preceding examples.

*Catalyst E—Tetramethylammonium Triphenylcyanoborate*

Solution I: Parts by wt.
Tetramethylammonium chloride _____ 8.5
Water _____ 91.5
Acetic acid to pH-6.

Solution II:
Sodium triphenylcyanoborate _____ 20
Water _____ 180

*Catalyst F—Mixed Alkyltrimethyl/Dialkyl Dimethyl-Ammonium Triphenylcyanoborate*

Solution I: Parts by wt.
"Arquad"-2C—50% active in aqueous isopropanol _____ 30.7
"Arquad"-T—50% active in aqueous isopropanol _____ 24
Isopropanol _____ 150
Water _____ 150
Acetic acid to pH-6.

Solution II:
Sodium triphenylcyanoborate _____ 20
Water _____ 180

The approximate compositions of the respective alkyl portions of "Arquad"-2C and "Arquad"-T are shown in Table I. Substitution of 54.7 parts of 50% solution of "Arquad"-T-2C for the indicated parts of "Arquad"-2C and "Arquad"-T provides an equivalent product.

Preparation of Catalyst E and Catalyst F follows the indicated general process.

All of these organoammonium organoborate salts are characterized by solubility in water significantly less than 1 part per 100 parts of water. Organoammonium salts having the tetraphenylboron anion or triphenylcyanoboron anion are sufficiently insoluble to permit the use of sodium salts having these anions for the quantitative determination of amines and quaternaryammonium compounds.

Ordinarily effective proportions of the organoammonium-organoborate curing agent will fall in the range of 0.2 to 2 parts per 100 parts by weight of the organic film-forming components of the composition, proportions in excess of 2 parts being required only with relatively higher than average molecular weight of the curing agent. With unusually high molecular weight species of the insoluble organoborate salt, such as those having 40 to 50 carbon atoms in the quaternaryammonium cation, the effective useful proportion can be as high as 3 parts. With low molecular weight species, such as the $C_1$–$C_4$ alkylammonium salts having the defined organoboron anion, the practical minimum proportion for effective curing can be as low as 0.1 part on the indicated basis.

The compositions for which these insoluble organoammonium organoborate salts effectively function as latent curing agents comprise, as the essential organic film-forming material, a mixture of (a) a carboxyl-containing addition copolymer of ethylenically unsaturated monomers and (b) a resinous epoxy condensate having an average of more than one, preferably up to about two, 1,2-oxirane oxygen atoms per molecule, these component film-forming materials being organic-solvent-soluble and compatible in solution.

The composition of the carboxyl-containing addition copolymer can be varied appropriately to meet the requirements pertinent to the ultimate end use. It is desirable for the copolymer to include an appropriate plurality of carboxyl sites therein to provide the desired degree of cross-linking without having excessive carboxyl equivalents unreacted with the epoxy condensate in the cross-linked product. Variation in the content of carboxyl substituent in the copolymer is attained by copolymerizing appropriate proportions of a carboxyl-supplying monomer with one or more monomers which are free of active carboxyl substituents.

The carboxyl - supplying ethylenically - unsaturated monomer can be widely selected. Copolymerizable monocarboxylic acids, dicarboxylic acids and acids having an even greater plurality of carboxyl substituents per molecule can be used. Preferably the carboxylic monomer is alpha monoethylenically unsaturated. Monocarboxylic acids having ethylenic unsaturation in the form of an alpha methylene group, such as acrylic acid and methacrylic acid, are particularly preferred. Partial esters of alpha monoethylenically unsaturated alpha, beta dicarboxylic acids, such as the half esters of maleic acid or fumaric acid particularly with a $C_1$–$C_{12}$ alkanol, are also preferred. Acidic partial vinyl esters of dicarboxylic acids which are free of polymerizable unsaturation in the acid portion can be used to provide polymers in which the carboxyl substituent is a component of an extra-linear group rather than being attached directly to a carbon atom in the linear chain of the copolymer. Practical copolymers ordinarily will have an acid number no greater than 150. Preferred copolymers have an acid number in the range of 20–100, although useful copolymers can have an acid number as low as 10.

Like the carboxyl-supplying monomer component, the carboxyl-free monomer components copolymerized therewith can be widely selected. Since these latter monomers ordinarily contribute a major proportion of the copolymer, the choice of these comonomers is dictated mainly by the characteristics desired in the copolymer product. Styrene, methylstyrene, vinyltoluene and butadiene-1,3 are typical hydrocarbon monomers which can be copolymerized with ethylenically unsaturated carboxylic monomers to provide useful copolymers having reactive carboxyl substituents. Simple copolymers of a carboxyl-supplying monomer and a copolymerizable ethylenically unsaturated hydrocarbon monomer ordinarily do not provide the balance of properties desired in the copolymer for many coating uses relating to metal protection, particularly where the coating is subject to severe exposure conditions. For purposes of obtaining the optimum balance of properties in the copolymer to conform with the needs associated with such end uses, it is usually necessary to include with the hydrocarbon monomer component at least one or more ester monomer components, i.e. the copolymerizable monomer mixture ordinarily is at least ternary in composition. For example, one or more $C_1$–$C_{12}$ alkanol, preferably $C_1$–$C_4$ alkanol, esters of acrylic acid are particularly useful as plasticizing monomer components in combination with styrene, such acrylates on homopolymerization yielding relatively soft polymers. Further variation can be accomplished by including alkanol esters of methacrylic acid in the monomer mixture, particularly $C_1$–$C_4$ alkanol esters of methacrylic acid which on homopolymerization yield relatively hard polymers. The monomer mixture can be still more complex by including effective proportions of other classes of copolymerizable monomers which provide a functional advantage in the copolymer. Acrylonitrile is typical of such supplemental monomers which provide a functional advantage.

The addition copolymers can be prepared by any of the well known techniques of polymerizing monomers or comonomers. They can be prepared by bulk, solution, or emulsion polymerization. The degree of polymerization is not critical, but for coating purposes it is desirable that degree of polymerization be sufficient to yield a copolymer which is a non-tacky solid at room temperature. Polymerization is not advanced to a degree where the polymer ceases to be soluble at practical concentrations in practical volatile liquid organic solvents. About 5% of carboxyl-containing copolymer in solution applicable by ordinary coating techniques represents a practical minimum concentration for coating formulations.

A wide variety of vic-epoxy condensates having an average of more than one

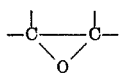

1,2-oxirane moiety per molecule can be used in combination with the carboxyl-containing copolymer. Particularly useful condensates of this class are obtained by reaction of dihydric or polyhydric phenols or polynuclear phenols with epichlorohydrin in an alkaline solution. Typical commercial epoxy condensates of this class are obtained by the reaction of epichlorohydrin with the bis-phenol resulting from acidic condensation of 2 mols of phenol with one mol of acetone, this bis-phenol also being referred to as diphenylolpropane. The resulting epoxy condensate is characterized by the general formula:

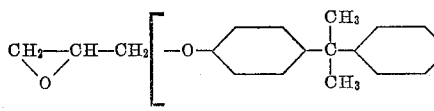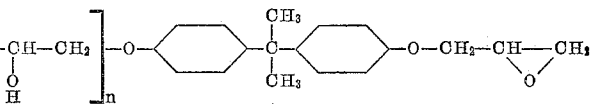

where $n$ is an integer 0, 1, 2, 3, etc. indicative of the degree of polymerization. The average molecular weight of the vic-epoxy condensate preferably is no greater than about 3000. This average molecular weight corresponds to an average value of $n$ of about 10 and includes species in which $n$ may range up to 20. Inasmuch as the described vic-epoxy condensate contains two 1,2-oxirane oxygen atoms or vic-epoxy groups per molecule, the 1,2-epoxy equivalent weight is one half the average molecular weight. Thus the 1,2-epoxy equivalent weight of useful condensates preferably is no greater than 1500, i.e. the condensate on the average contains at least one 1,2-epoxy group per 1500 grams. Preferably the 1,2-epoxy equivalent of the condensate is from 190 to 1000.

While useful vic-epoxy condensates can include liquid species, those which are highly viscous or solid at room temperature are usually preferred for coating purposes. Such epoxy condensates are commercially available under the trade-mark "Epon" epoxy resin, "Epi-Rez" epoxy resin and "Araldite" ethoxyline resin. Epoxy condensates characterized by 1,2-epoxy equivalent weights respectively above and below the indicated limits can be appropriately blended to provide a mixture having a vic-epoxy equivalent within the specified range. Other compounds containing 1,2-oxirane oxygen can advantageously supplement the resinous epoxy condensates described above. Examples of such compounds are unsaturated fatty acids epoxidized by known methods, epoxidized esters of unsaturated fatty acids with alcohols, and esters of epoxy condensates having the aforementioned general formula wherein one or more of the hydroxyls thereof are esterified with a fatty acid.

The relative proportions of the carboxyl-containing copolymer, the 1,2-epoxy condensate and supplemental 1,2-oxirane oxygen compounds can be varied widely. For coating purposes, the molar ratio of

for the combination of organic film-forming materials can range satisfactorily from 0.25 to 10, preferably from 0.5 to 4. Ordinarily the weight proportion of 1,2-epoxy condensate is no greater than 100 parts, preferably no greater than 50 parts, per 100 parts of the carboxyl-containing copolymer. Where optimum color retention of white and light colored coatings is desired, the proportion of 1,2-epoxy condensates, particularly those derived from dihydric phenols, preferably is no greater than 30 parts. At least 5 parts of the 1,2-epoxy condensate per 100 parts of the acidic copolymer ordinarily is required to provide a practical crosslinking contribution to the combination of organic film-forming materials. The following are typical calculations of the

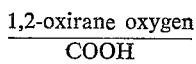

ratio in useful combinations of the carboxyl-containing copolymer and the compounds which supply 1,2-oxirane oxygen. 100 grams of carboxyl-containing copolymer having an acid number of 56 which provides 0.1 mol of carboxyl substituent are mixed with 30 grams of epoxy condensate having a 1,2-epoxy equivalent weight of 200 which provides 0.06 mol of 1,2-oxirane oxygen. The combination has a

ratio of 0.6. When this combination further includes 10 grams of an epoxidized fatty acid ester having a 1,2-oxirane oxygen content of 4%, i.e. an epoxy equivalent weight of 400, the total amount of the 1,2-oxirane oxygen is 0.085 mol and the

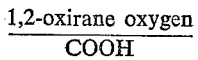

molar ratio is 0.85.

The volatile liquid portion of the composition preferably is organic including at least one organic solvent for the copolymer and the epoxy condensate. Ordinarily this organic liquid portion is a mixture of solvents and nonsolvent diluents in appropriate proportions which provide a desired balance in solids/viscosity relationship and balance in evaporation rate. The volatile organic solvent portion ordinarily includes aromatic hydrocarbon solvents such as toluol, xylol, benzol, or high solvency hydrocarbons having a substantial aromatic content. These solvents are ordinarily used in the preparation of the copolymer by solution polymerization techniques and they can be supplemented with alcohols, esters and ketones of the types ordinarily found in coating formulations. Aliphatic hydrocarbons can be included as suitable diluents to the extent that the film-forming organic materials remain compatible in solution in the solvent/diluent mixture. The boiling range of these volatile liquid components is not critical except that it is essential that they readily evaporate from the applied wet coating during the subsequent curing or baking step and leave a dry finish. Practical solvents and diluents ordinarily will have a boiling range within the temperature range of 80° C.–275° C.

The volatile organic liquid portion is substantially free of water, but water may be present in a tolerant small amount as introduced with the various ingredients having a water content corresponding to ordinary commercial quality of dryness. On the other hand, the essential organic film-forming materials can be in particulate form of small micron size dispersed in an aqueous medium including a water-soluble volatile organic solvent in a small effective proportion sufficient to cause coalescence of the organic film-forming particles to a continuous film on substantial loss of water from a wet coating of the composition at ordinary application thickness, such as several mils.

The total proportion of the volatile liquid components can range widely. In the case of unpigmented compositions, the volatile content can be as high as 95% by weight practically and pigmented compositions, at practical package viscosity, can have as little as 10% by weight of the volatile liquid portion. Thus, the non-volatile content can range from 5% to 90% by weight.

Pigments ordinarily used in the formulation of enamels, paints and lacquers can be included in the invention coating compositions in amounts ranging form 1 to 200 parts per 100 parts by weight of the organic film-forming material. Prime pigments are ordinarily used in proportions up to 100 parts. At higher proportions, the total pigment usually is composed of an appropriate mixture of prime pigment and extender pigment. Suitable pigments include metal oxides, hydroxides or hydrous oxides, chromates, silicates, sulfates, sulfides, and carbonates, carbon black, organic dyestuffs and lakes thereof, metal flakes and lamellar pigments such as mica. Because of the reactive carboxyl substituents of the addition polymer, use of strongly-basic, acid-sensitive and reactive pigments is preferably avoided.

In addition to the various identified pertinent components, ancillary materials can be present in the final compositions. Examples of such materials are compatible organic solvent-soluble resins of which resinous polyesters, oil modified alkyd resins, phenol-formaldehyde resins, urea/formaldehyde/alkanol condensates, melamine/formaldehyde/alkanol condensates are representative; plasticizers, slip or antiabrasion agents such as dispersible vegetable waxes, polyethlyene wax, microcrystalline waxes, and perfluorocarbon waxes, metal driers, pigment dispersing agents, bodying and suspending agents, surface controlling agents such as the polymethylsiloxanes, and still other functional modifiers in ordinary amounts commonly found in coating formulations.

The organoammonium-organoborate latent curing agent, being a dry solid material, is incorporated in the coating composition by treating it in the same manner as a pigment component and uniformly dispersing it in the composition by including the latent curing agent with the pigment in the pigment dispersion portion of the formulation or separately dispersing it in the organic film-forming material. Any of the ordinary pigment dispersion techniques can be used provided operating temperatures do not exceed the decomposition temperature of the organoammonium organoborate salt, preferably no higher than 200° F. The sand grinding technique of U.S. Patent 2,581,414 is particularly useful for dispersing the insoluble latent curing agent in the organic film-forming material either alone or in combination with pigment. Because of potential reactivity of the latent curing agent under temperature conditions which may prevail during the dispersion process, it is preferable to avoid the presence of components containing the reactive 1,2-epoxy functionality in the dispersion portion of the composition. The carboxyl-containing polymer in solution, either alone or in combination with ancillary organic film-forming materials non-reactive with the latent curing agent, is preferably used as the dispersion vehicle. When a dispersible incompletely-soluble wax, such as vegetable wax, polyethylene wax, perfluorocarbon wax or microcrystalline hydrocarbon wax is to be included in the coating composition, it is advantageous to disperse the wax in combination with the latent curing agent in the dispersion portion as the resulting wax coating on the organoammonium organoborate salt crystals usually enhances the stability of the single package catalyzed composition at ordinary storage temperatures.

The invention coating compositions containing the latent curing agent can be applied by spraying, brushing, dipping, roller coating, flow coating, or any of the methods ordinarily used in commercial coating operations, particularly in the finishing of appliances and vehicles, such as automobiles and trucks.

Curing of the coating applied to a heat-resistant substrate can be by any of the usual techniques of heating sufficiently to raise the temperature of the coating to 250°–500° F. Baking for 10 minutes at 450° F.–500° F. ordinarily accomplishes adequate cure of coatings applied at usual thickness. Usually 60 minutes is adequate at 250° F. Preferred heating conditions for optimum results are 15–20 minutes at 350° F. to 30–45 minutes at 275° F.

The following examples are illustrative of the principles and practice of the invention, the scope thereof not being limited to the specific details of these examples. Throughout the specification, the indicated parts and percentages are on a weight basis unless otherwise specifically designated.

EXAMPLE 1

Parts by wt.
Dispersion portion:
    Titanium dioxide pigment _____ 245
    Terpolymer I solution—55% polymer content _____ 89
    Butanol _____ 61.5
    High solvency hydrocarbon "Solvesso" 100 __ 10
    Catalyst A _____ 2.5

Second portion:
Terpolymer I solution—55% polymer content ------------------------------------ 356
Epoxy condensate "Epon" 828 ------------ 31
Plasticizer "Paraplex" G-62 -------------- 31
Butanol ------------------------------------ 19
Isopropanol -------------------------------- 73
High solvency naphtha "Solvesso" 100 ------ 82

1,000

The Terpolymer I solution is the polymerization product of a ternary monomer mixture of styrene, ethyl acrylate and maleic anhydride, the latter component being partially esterified with 2-ethylhexanol. This mixture of monoethylenically unsaturated monomers in a high solvency hydrocarbon solvent for the copolymer are copolymerized at about the reflux temperature of the monomer/hydrocarbon mixture. The preparation is more specifically described as follows:

*Terpolymer I Solution*

Parts by wt.
First portion:
High solvency hydrocarbon "Solvesso" 100 --- 152
Industrial Xylol ------------------------- 50
Second portion:
Styrene ------------------------------ 248
Ethyl acrylate ------------------------- 165
Maleic anhydride ---------------------- 59
Ditertiarybutyl peroxide ---------------- 5
Third portion:
2-ethylhexanol ------------------------ 157
Fourth portion:
Industrial Xylol ---------------------- 164

1,000

The first portion is heated to reflux temperature of about 308° F. The second portion is premixed, added to the first portion at a uniform rate over a period of 4 hours and then held at reflux temperature for 2 hours. The third portion is added and esterification carried out over a 2 hour period at reflux temperature. Then the heat is cut off, the fourth portion added and mixing is continued for ½ hour. This terpolymer solution has a non-volatile content of 55%, a viscosity of about $Z_4$ Gardner-Holdt at 25° F. and an acid number of about 61. The "Solvesso" 100 hydrocarbon solvent is characterized by a boiling range of 150°–190° C. and an aniline point of about −28° C.

The "Epon" 828 epoxy condensate is the product of condensing epichlorohydrin and diphenylol propane in alkaline solution. The condensation product is characterized by an epoxy equivalent of about 200 and a melting point in the range of 8°–12° C.

"Paraplex" G-62 is an epoxidized unsaturated fatty acid ester plasticizer, the fatty acid component being present in the form of soya oil.

The quaternaryammonium tetraphenylborate and the pigment in the dispersion portion are dispersed in the terpolymer vehicle by sand grinding at an output rate of 2.3 gallons per hour, the temperature during the grind being about 128° F. The second portion is added to the dispersion portion and mixed until the composition is uniform. The components of the second portion are added individually but they can be premixed and then added.

The resulting liquid coating composition exhibits a viscosity of 20″ #3 Zahn viscosity cup at 25° C. Package stability of the composition at ordinary room temperature of about 77° F. is excellent, the viscosity remaining at 20″ when measured at monthly intervals during 4 months' storage and exhibiting a slight increase at 6 months. In accelerated stability tests conducted by storing samples in a 120° F. oven and measuring the viscosity weekly, the composition retains its original 20″ viscosity for 2 weeks, increases to 37″ in 3 weeks and gels in 4 weeks.

The relative proportions of the pertinent components of this coating composition are approximately:

Parts
Terpolymer --------------------------- 100
Epoxy condensate --------------------- 12.6
Epoxy plasticizer -------------------- 12.6
Catalyst A --------------------------- 1
Pigment ------------------------------ 100

The proportion of Catalyst A is about 0.8 part per 100 parts by weight of the essential organic film-forming materials.

A comparative composition A is similarly prepared substituting 2 parts of octyldecyltrimethylammonium acid phthalate for the indicated 2.5 parts of Catalyst A. Comparative composition B is similarly prepared by omitting Catalyst A from the composition. Comparative composition A registers about 70% increase in viscosity over the initial viscosity in 5 days, about a ten-fold increase in 8 days and gelled in 9 days in the accelerated aging test at 120° F. This composition stored at room temperature, about 77° F., exhibits a significant increase in viscosity and gels in two months. Comparative composition B, which is uncatalyzed exhibits a slight increase in viscosity during four weeks' storage at 120° F., the increase being less than 50% over the initial viscosity. At room temperature, the viscosity of this composition increases less than 50% in six months. Catalyzed compositions which do not gel in two weeks at 120° F. are considered to have practical storage stability at room temperature. Catalyzed compositions which exhibit a viscosity increase at 120° F. of no more than about two-fold, i.e. 200%, ordinarily are adequately package-stable at room temperature for a period of six months or longer.

The Example 1 composition and the comparative composition A are appropriately thinned with a high solvency naphtha/butanol mixture to a spraying viscosity of about 30″ #2 Zahn cup at 25° C., applied to "Bonderized" steel panels to a dry film thickness of 1.5–1.8 mils, and cured by baking for 30 minutes at 350° F. The film properties of the respective cured coatings, which are representative appliance finishes, are comparable in reference to hardness, degree of cure as measured by chemical resistant to various household materials which may come in contact with appliance finishes such as soap, detergents, grease, hot water, high humidity, etc. Comparative composition B similarly treated does not cure satisfactorily in the absence of curing agent.

Catalyst B substituted directly for Catalyst A produces identical results in package-stability and product performance.

EXAMPLE 2

Dispersion portion: Parts by wt.
Titanium dioxide pigment ---------------- 257
Terpolymer I solution—55% polymer content ------------------------------ 89
Wax dispersion—10% wax ---------------- 86
Catalyst E ---------------------------- 2
Butanol ------------------------------- 50
High solvency hydrocarbon "Solvesso" 100 -- 10
Second portion:
Terpolymer I solution—55% polymer content ------------------------------ 387
Epoxy condensate "Epon" 828 ------------ 28
Butanol ------------------------------- 44
Diacetone alcohol --------------------- 15
Isopropanol --------------------------- 32

1,000

The wax dispersion is prepared by dissolving 10 parts of polyethylene wax in 30 parts of industrial xylol by heating the mixture at about 212° F. until clear, then diluting with 60 parts of butanol and milling the composition in a pebble mill for 72 hours to provide a uniform dispersion. Preparation and use of such polyethylene wax compositions in coating is described in U.S. Patent 2,518,462. In lieu of the separate addition of Catalyst E, it may be included in this wax dispersion. The curing agent preferably is added after the butanol-dilution which serves to cool the mixture and precipitate the wax. Preparation of the coating compostiion is the same as in the preceding example.

The initial viscosity of the composition is 26″ #3 Zahn cup at 25° C. and during storage at 120° F. the viscosity increases about 1.7 fold to 70″ in six weeks with no gelation in eight weeks. At room temperature, the composition remains stable with the viscosity increasing only 35% in 6 months. Corresponding compositions having a catalyst concentration of from 0.3 to 1.2 part of tetramethylammonium triphenylcyanoborate per 100 parts of the organic film-forming material exhibit equally good stability. These several compositions, characterized by the indicated different concentration levels of curing agent, exhibit film properties comparable with those of a comparative composition C identically formulated except that octadecyltrimethylammonium acid phthalate is directly substituted for Catalyst E. The liquid comparative composition C gelled in one week at 120° F.

EXAMPLE 3

| Dispersion Portion I: | Parts by wt. |
|---|---|
| Titanium dioxide pigment | 274 |
| Terpolymer I solution—55% polymer content | 95 |
| Butanol | 101 |
| High solvency hydrocarbon "Solvesso" 100 | 11 |
| Dispersion Portion II: | |
| Terpolymer I solution—55% polymer content | 36.4 |
| Catalyst C | 2.0 |
| Isopropanol | 11.6 |
| Third Portion: | |
| Terepolymer I—55% polymer content | 307 |
| Epoxy condensate solution—50% resin | 122 |
| Isopropanol | 22 |
| Wax base—32% non-volatile | 18 |
| | 1,000 |

The epoxy condensate solution consists of 50% epoxy resin "Epon" 1001 in a mixture of equal parts by weight of xylol and anhydrous isopropanol. "Epon" 1001 is characterized by an epoxy equivalent of 450 to 525 and has a melting point of about 70° C.

In this example, the latent curing agent is separately dispersed in the solution of carboxyl-containing copolymer by sand grinding, the same technique being used to separately disperse the pigment. The indicated Dispersion Portion II contains 10 parts of the curing agent per 100 parts of the copolymer present in the dispersion at a concentration of 40% by weight thereof. Each 5 parts of this catalyst dispersion provides 1 part of curing agent and 2 parts of the copolymer for convenient modification of the formulation. Compensation in copolymer and solvent content are readily accomplished in the third portion to accommodate variations in curing agent concentration in the complete product provided by other proportions of the Dispersion Portion II.

The wax base is the product of pebble grinding a mixture of 15 parts of polymerized microcrystalline wax, 30.8 parts of the Terpolymer I solution and 54.2 parts of butanol for about 25,000 cycles with the mill temperature not exceeding 120° F. The wax is "Polymekon," supplied by Warwick Wax Co., Inc. having a softening point of 195°–200° F. and ASTM-D-5-32 penetration of 2–3.

An appropriate amount of Catalyst C can be included in either the wax dispersion or the pigment dispersion in lieu of the separate dispersion thereof, but the separate dispersion of the curing agent is desirable because variation of curing agent content can be manipulated independent of the wax contribution and pigment contribution to the composition.

This composition is adequately package-stable at room temperature for at least six months. This composition exhibits a viscosity increase, from the initial viscosity of 30 seconds #3 Zahn cup at 25° C., of 15 seconds in one week 22 seconds in two weeks, and 45 seconds in three weeks with no gelation in four weeks, when stored in a 120° F. oven. A comparative composition D-1 identical in composition with Example 3, except soluble octadecyltrimethylammonium acid phthalate is substituted for Catalyst C, gels in one week at 120° F. A second comparative composition D-2, identical with D-1 except that the concentration of this soluble curing agent is 0.15 part in place of 0.65 part per 100 parts by weight of the organic film-forming material, exhibits 100% increase in viscosity in one wek, about 450% increase in two weeks and gels in three weeks.

The cure and performance of the respective applied coatings of Example 3 and comparative composition D-1 are equal when baked at 300° F. for 30 minutes. Composition D-2 exhibits a lesser degree of cure.

EXAMPLE 4

| Dispersion portion: | Parts by wt. |
|---|---|
| Titanium dioxide pigment | 250 |
| Catalyst B | 2 |
| High solvency hydrocarbon "Solvesso" 100 | 40 |
| Xylol | 40 |
| Interpolymer II solution—55% polymer content | 90 |
| Second portion: | |
| Interpolymer II solution—55% polymer content | 255 |
| Castol oil | 38 |
| Epoxy condensate "Epon" 828 | 38 |
| Epoxy varnish ester 60% resin content | 64 |
| Melamine/formaldehyde/butanol condensate—50% resin in 5:1 butanol:xylol | 152 |
| Butanol | 16 |
| Diacetone alcohol | 15 |
| | 1,000 |

Proportions of components in 100 parts of the organic film-forming material are: Interpolymer II—50, castor oil—10, epoxy condensate—10, epoxy varnish—10, and melamine condensate—20 parts. The proportion of Catalyst B is about 0.5 part per 100 parts of the organic film-forming material.

The dispersion portion is prepared by the sand grinding technique described above, the ingredients of the second portion are added to the completed dispersion portion and the composite mixed until uniform.

Interpolymer II is the solution polymerization product of the following composition:

| First portion: | Parts by wt. |
|---|---|
| High solvency hydrocarbon "Solvesso" 100 | 430 |
| Second portion: | |
| Styrene | 700 |
| Methacrylic acid | 100 |
| Ethyl acrylate | 200 |
| Tertiarybutyl peroxide | 10 |
| Third portion: | |
| Industrial xylol | 230 |
| Butanol | 150 |
| | 1,820 |

The first portion is heated to reflux temperature of 156°–160° C. The second portion, premixed, is slowly added to the first portion over a period of 3–4 hours with the polymerization temperature maintained at 148°–150° C., thereafter held at this temperature for 90 minutes, then cooled below the initial boiling temperature of the third portion solvents, and then diluted by addition of the third portion. The resulting interpolymer solution has a polymer content of about 55% by weight and a Gardner-Holdt viscosity of about Z-1 at 25° C. The interpolymer per se has a relative viscosity of 1.089 determined at 0.500 gram concentration in 50 ml. of ethylene dichloride using a Cannon-Fenske (modified Ostwald) viscosimeter size No. 100. The epoxy varnish is the product of varnish cooking 302 parts of epoxyhydroxypolyether resin ("Epon" 1004 epoxy equivalent 905–985) and 203 parts of soya oil acids at 500° F. with a mild $CO_2$ gas blow to an acid number of about 5 and a viscosity of $Z_3$–$Z_4$ at 60% concentration and then thinning to this concentration wiht about 328 parts high solvency hydrocarbon ("Solvesso" 100).

This coating composition is package-stable at room temperature, being free of gelation or significant bodying during six months storage. In the 120° F. accelerated stability test, the composition exhibits a moderate advance in viscosity, up to about 40%, in 2 weeks and no gelation in 4 weeks. A Comparative Composition E of equivalent formulation containing 0.5 part of soluble octadecyltrimethylammonium acid phthalate as the curing agent gels in less than two weeks at 120° F. and gels in two months at room temperature.

This Example 4 composition is useful as a topcoat finish for automobile bodies. The composition thinned for spray application, applied to primed autobody steel at the usual topcoat thickness is cured adequately by baking for 30 minutes at 275° F. The film properties and degree of cure of the resulting finish are comparable with those of the comparative product cured under equal conditions.

The foregoing examples are for the purpose of clearly illustrating the invention and no unnecessary limitations of the invention are to be inferred therefrom. The invention is not intended to be limited except as defined in the appended claims.

I claim:

1. A liquid coating composition comprising, as the essential organic film-forming components thereof, a mixture of (a) an organic solvent-soluble acidic copolymer of a plurality of alpha,beta monoethylenically-unsaturated monomers, at least ternary in composition, consisting essentially of (I) an alpha,beta monoethylenically-unsaturated monocyclic aryl hydrocarbon, (II) at least one $C_1$ to $C_{12}$ alkanol ester of an alpha,beta monoethylenically-unsaturated monocarboxylic acid, and (III) an alpha,beta monoethylenically-unsaturated carboxylic acid monomer having from one to two —COOH moieties per molecule, the proportion of said carboxylic acid monomer (III) being sufficient to provide the resulting acidic copolymer with a carboxylic acid number in the range of 10 to 150, and (b) an organic-solvent-soluble resinous vic-epoxy condensate characterized by an average of more than one

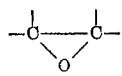

1,2-oxirane moiety per molecule, a molecular weight up to about 3000, a 1,2-oxirane equivalent weight up to about 1500, reactive functional groups in said vic-epoxy condensate being limited to said 1,2-oxirane moieties and hydroxyl moieties, the relative proportions of said acidic copolymer (a) and said vic-epoxy condensate (b) being such that the molar ratio for

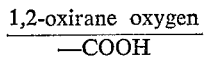

is in the range of 0.25 to 10, said organic film-forming components being in solution in a volatile liquid portion comprising at least one organic solvent therefor, and, as a latent curing agent for said film-forming components, (c) a substantially water-insoluble organoammonium organoborate salt in the proportion of 0.1 to 3 parts per 100 parts by weight of said film-forming components, said borate salt having the general formula:

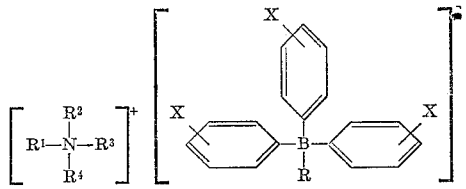

whereof: one to four of the monovalent radicals $R^1$—, $R^2$—, $R^3$— and $R^4$— of the indicated organoammonium cation are $C_1$ to $C_{20}$ monovalent hydrocarbon radicals; when said hydrocarbon radicals are less than four, the remaining said radicals joined to the ammonium nitrogen atom being —H, the total number of carbon atoms in said cation being up to 50; the

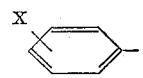

radicals joined to the boron atom of the indicated anion are electronegative aryl radicals having the X— substituent selected from the group consisting of —H, —F, —Cl, —Br, —I, —CN, —OH, —$NO_2$, and $C_1$ to $C_4$ alkyl, and the monovalent radical R— is an electronegative radical selected from the group consistin of

—CN, —F, —Cl, and —Br.

2. A liquid coating composition of claim 1 wherein the organoboron anion of said latent curing agent (c) is characterized by having said substituent X— joined to the para carbon atom of the phenyl ring.

3. A liquid coating composition of claim 1 wherein the organoboron anion of said latent curing agent (c) is characterized by the radical R— being

4. A liquid coating composition of claim 1 wherein the organoboron anion of said latent curing agent (c) is characterized by having four phenyl groups joined to the boron atom.

5. A liquid coating composition of claim 19 wherein the organoboron anion of said latent curing agent (c) is characterized by

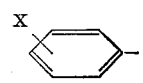

being phenyl and R— being —CN.

6. A liquid coating composition of claim 1 wherein the indicated organoammonium cation of said latent curing agent (c) is a quaternary ammonium cation having four said hydrocarbon radicals joined to the ammonium nitrogen atom of which at least two said hydrocarbon radicals are $C_1$ to $C_4$ alkyl.

7. A liquid coating composition of claim 6 wherein said quaternary ammonium cation is characterized as having two to three $CH_3$— radicals and at least one $C_8$ to $C_{20}$ acyclic hydrocarbon radical joined to the ammonium nitrogen atom.

8. A liquid coating composition of claim 1 wherein said acidic copolymer is a polymerization product of a mixture of alpha,beta monoethylenically-unsaturated monomers, at least ternary in composition, consisting essentially of (I) an alpha,beta monoethylenically-unsaturated monocyclic aryl hydrocarbon, (II) at least one $C_1$–$C_{12}$ alkanol ester of an alpha,beta monoethylenically-unsaturated monocarboxylic acid and (III) an alpha,beta monoethylenically-unsaturated carboxylic acid monomer having from one to two —COOH moieties per molecule, the proportion of said carboxylic monomer being sufficient to provide the resulting carboxylic interpolymer with a carboxylic acid number in the range of 20 to 100, and wherein said resinous vic-epoxy condensate is characterized by a 1,2-oxirane equivalent weight in the range of 190 to 1000 and is present in such proportions that the molar ratio

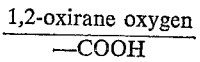

is in the range of 0.5 to 4.

9. A liquid coating composition of claim 8 wherein said acidic copolymer is the polymerization product of (I) styrene, (II) at least one $C_1$ to $C_{12}$ alkanol ester of an alpha,beta monoethylenically-unsaturated monocarboxylic acid having a terminal alpha methylene group, and, as said carboxylic acid monomer (III), a monocarboxylic partial ester of an alpha monoethylenically-unsaturated, alpha,beta dicarboxylic acid with a saturated aliphatic monohydric alcohol made up of carbon, hydrogen and oxygen atoms.

10. A liquid coating composition of claim 8 wherein said acidic copolymer is the polymerization product of (I) styrene, (II) at least one $C_1$ to $C_{12}$ alkanol ester of an alpha,beta monoethylenically-unsaturated monocarboxylic acid having a terminal alpha methylene group, and, as said carboxylic acid monomer (III), an alpha,beta monoethylenically-unsaturated monocarboxylic acid having a terminal alpha methylene group.

11. The liquid coating composition of claim 1 wherein said resinous vic-epoxy condensate is the reaction product of epichlorohydrin and disphenylolpropane, said vic-epoxy condensate having said 1,2-oxirane moieties and hydroxyl moieties as reactive groups therein.

12. A liquid coating composition of claim 11 having said vic-epoxy condensate (b) and said acidic copolymer (a) in such proportions that the molar ratio of

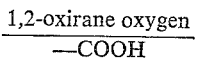

is from 0.5 to 4.

13. A package-stable, heat-curable liquid coating composition comprising, as the essential organic film-forming components, a mixture of (a) an organic solvent-soluble acidic copolymer of a plurality of alpha,beta monoethylenically-unsaturated monomers, at least ternary in composition, consisting essentially of (I) styrene, (II) at least one $C_1$ to $C_{12}$ alkanol ester of acrylic acid, and (III) a monocarboxylic partial ester of maleic acid with a $C_1$ to $C_{12}$ alkanol, said monocarboxylic partial ester (III) being sufficient to provide said acid copolymer with a carboxylic acid number in the range of 10 to 150, and (b) an organic-solvent-soluble resinous vic-epoxy condensate characterized as having a plurality of up to two

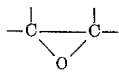

1,2-oxirane moieties per molecule and a 1,2-oxirane equivalent weight up to about 1500, reactive functional groups in said vic-epoxy condensate being limited to said 1,2-oxirane moieties and hydroxyl moieties, the relative proportion of said vic-epoxy condensate (b) and said acidic copolymer (a) being such that the molar ratio of

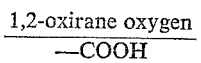

is from 0.5 to 4, said film-forming components being in solution in a volatile liquid portion comprising at least one organic solvent therefor, pigment in the proportion of 1 to 200 parts, and, as a latent curing agent for said film-forming components, 0.1 to 3 parts of (c) a substantially water-insoluble organoammonium organoboron, salt having the general formula

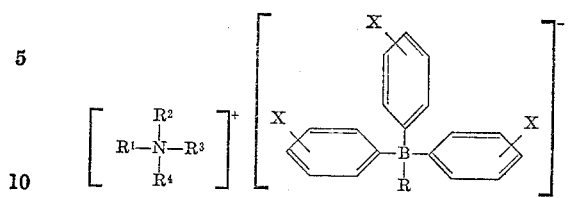

whereof: one to four of the monovalent radicals $R^1$—, $R^2$—, $R^3$— and $R^4$— of the indicated organoammonium cation are $C_1$ to $C_{20}$ monovalent hydrocarbon radicals; when said hydrocarbon radicals are less than four, the remaining said radicals joined to the ammonium nitrogen atom being —H, the total number of carbon atoms in said cation being up to 50; the

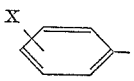

radicals joined to the boron atom of the indicated anion are electronegative aryl radicals having the X— substituent selected from the group consisting of —H, —F, —Cl, —Br, —I, —CN, —OH, —NO₂, and $C_1$ to $C_4$ alkyl and the monovalent radical R— is an electronegative radical selected from the group consisting of

—CN, —F, —Cl, and —Br, said parts of pigment and of latent curing agent being based per 100 parts by weight of said organic film-forming components.

14. A liquid coating composition of claim 13 wherein said latent curing agent (c) is a quaternary ammonium salt having tetraphenylboron as the anion thereof, the quaternary ammonium cation having four said hydrocarbon radicals joined to the ammonium nitrogen atom of which two to three are CH₃— radicals and at least one is a $C_8$ to $C_{20}$ acyclic hydrocarbon radical.

15. A package-stable, heat-curable liquid coating composition comprising, as the essential organic film-forming components, a mixture of (a) an organic-solvent-soluble acidic copolymer of a plurality of alpha,beta monoethylenically-unsaturated monomers, at least ternary in composition, consisting essentially of (I) styrene, (II) at least one $C_1$ to $C_{12}$ alkanol ester of acrylic acid, and (III) methacrylic acid in a proportion sufficient to provide said acidic copolymer with a carboxylic acid number in the range of 10 to 150, and (b) an organic solvent-soluble resinous vic-epoxy condensate characterized as having a plurality of up to two

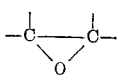

1,2 oxirane moieties per molecule and a 1,2-oxirane equivalent weight up to about 1500, reactive functional groups in said vic-epoxy condensate being limited to said 1,2-oxirane moieties and hydroxyl moieties, the relative proportions of said vic-epoxy condensate (b) and said acidic copolymer (a) being such that the molar ratio of

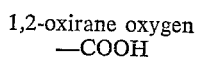

is from 0.5 to 4, said film-forming component being in solution in a volatile liquid portion comprising at least one organic solvent therefor, pigment in the proportion of 1 to 200 parts, an, as a latent curing agent for said film-forming components, 0.1 to 3 parts of (c) a susbtantially water-insoluble organoammonium-organoboron salt having atetraphenylboron anion and a quaternary ammonium cation having four monovalent hydrocarbon radicals joined to the ammonium nitrogen atom, of which two to four of said hydrocarbon radicals are $C_1$ to $C_4$ alkyl, up to two of said hydrocarbon radicals being $C_8$ to $C_{20}$ acyclic hydrocarbon radicals, the indicated parts of said pigment and said latent curing agent (c) being based per 100 parts by weight of said organic film-forming components.

16. A method of preparing a package-stable, catalyzed, heat-curable liquid coating composition comprising the steps of mixing an organic-solvent-soluble acidic copolymer (a) and an organic-solvent-soluble vic-epoxy condensate (b) in the presence of a volatile liquid comprising at least one organic solvent for said film-forming components (a) and (b) to form a solution thereof, and dispersing in particulate solid state in the resulting solution, as a latent curing agent, 0.1 to 3 parts, based per 100 parts by weight of said organic film-forming components, of (c) a substantially water-insoluble organoammonium-organoborate salt having the general formula:

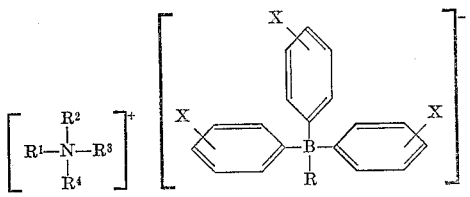

whereof: one to four of the monovalent radicals $R^1—$, $R^2—$, $R^3—$ and $R^4—$ of the indicated organoammonia cation are $C_1$ to $C_{20}$ monovalent hydrocarbon radicals; when said hydrocarbon radicals are less than four, the remaining said radicals joined to the ammonium nitrogen atom being —H, the total number of carbon atoms in said cation being up to 50; the

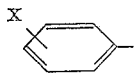

radicals joined to the boron atom of the indicated anion are electronegative aryl radicals having the X— substitutent selected from the group consisting of —H, —F, —Cl, —Br, —I, —CN, —OH, —NO$_2$, and $C_1$ to $C_4$ alkyl, and the monovalent radical R— is an electronegative radical selected from the group consisting of

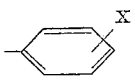

—CN, —F, —Cl, and —Br, said acidic copolymer (a) being the polymerization product of a plurality of alpha, beta monoethylenically-unsaturated monomers, at least ternary in composition, consisting essentially of (I) an alpha,beta monethylenically - unsaturated monocyclic aryl hydrocarbon, (II) at least one $C_1$ to $C_{12}$ alkanol ester of an alpha,beta monoethylenically-unsaturated monocarboxylic acid, and (III) an alpha,beta monoethylenically-unsaturated carboxylic acid monomer having from one to two —COOH moieties per molecule, the proportion of said carboxylic acid monomer (III) being sufficient to provide the resulting acidic copolymer with a carboxylic acid number in the range of 10 to 150, and said vic-epoxy condensate (b) being characterized by an average of more than one

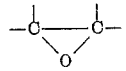

1,2-oxirane moiety per molecule, a molecular weight up to about 3000, a 1,2-oxirane equivalent weight up to about 1500, and having the reactive functional groups thereof limited to said 1,2-oxirane moieties and hydroxyl moieties, the relative proportions of said acidic copolymer (a) and said vic-epoxy condensate (b) being such that the molar ratio for $$\frac{\text{1,2-oxirane oxygen}}{\text{—COOH}}$$

is in the range of 0.25 to 10.

References Cited in the file of this patent

UNITED STATES PATENTS

| | | |
|---|---|---|
| 2,662,870 | Allenby | Dec. 15, 1953 |
| 2,918,444 | Phillips et al. | Dec. 22, 1959 |
| 2,934,516 | Hicks | Apr. 26, 1960 |

UNITED STATES PATENT OFFICE
CERTIFICATE OF CORRECTION

Patent No. 3,065,195                 November 20, 1962

Joseph A. Vasta

It is hereby certified that error appears in the above numbered patent requiring correction and that the said Letters Patent should read as corrected below.

Column 3, line 15, for "$R_4$-" read -- $R^4$- --; column 7, line 30, for "bydrocarbon" read -- hydrocarbon --; column 9, line 61, for "form" read -- from --; column 13, EXAMPLE 3, line 13, for "Terepolymer" read -- Terpolymer --; column 14, line 18, for "wek" read -- week --; column 16, line 50, for the claim reference numeral "19" read -- 1 --; column 17, line 35, for "disphenylolpropane" read -- diphenylolpropane --; line 54, for "acid" read -- acidic --; column 18, lines 64 and 65, and column 20, lines 32 and 33, each occurrence, for $$\frac{1,2\text{-oxirane oxygen}}{-COOH} \quad \text{read} \quad \frac{1,2\text{-oxirane oxygen}}{-COOH}$$

column 18, line 70, for "an" read -- and --; line 73, for "atetraphenylboron" read -- a tetraphenylboron --; column 19, line 27, for "organoammonia" read -- organoammonium --.

Signed and sealed this 14th day of May 1963.

(SEAL)
Attest:
ERNEST W. SWIDER
Attesting Officer

DAVID L. LADD
Commissioner of Patents